United States Patent [19]

Watkins

[11] 4,135,385

[45] Jan. 23, 1979

[54] METHOD OF DETERMINING THE LOCATION OF UNDERWATER PIPELINE LEAKS

[75] Inventor: John H. Watkins, San Dimas, Calif.

[73] Assignee: Southern California Edison Company, Rosemead, Calif.

[21] Appl. No.: 717,570

[22] Filed: Aug. 26, 1976

[51] Int. Cl.² ............................................. G01M 3/28
[52] U.S. Cl. ................................................. 73/40.5 R
[58] Field of Search ..................................... 73/40.5 R

[56] References Cited

U.S. PATENT DOCUMENTS 3,933,031  1/1976  Uhlarik ............................. 73/40.5 R Primary Examiner—Herbert Goldstein
Assistant Examiner—Joseph W. Roskos
Attorney, Agent, or Firm—Lyon & Lyon

[57] ABSTRACT

A method for determining the location of underwater pipeline leaks comprising first measuring the resulting pressure within the pipeline, calculating depth of pipeline at the site of the leak and then determining the location of the leak by reference to a graph of the profile of the pipeline which plots the depth of the pipeline against the distance of the pipeline from shore.

5 Claims, 2 Drawing Figures

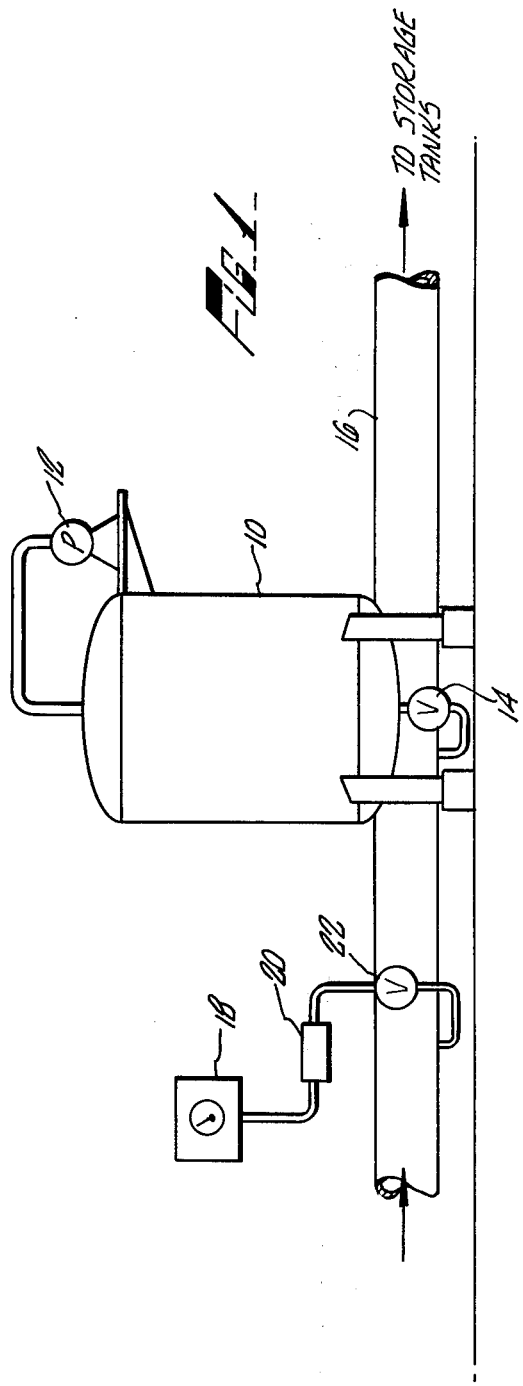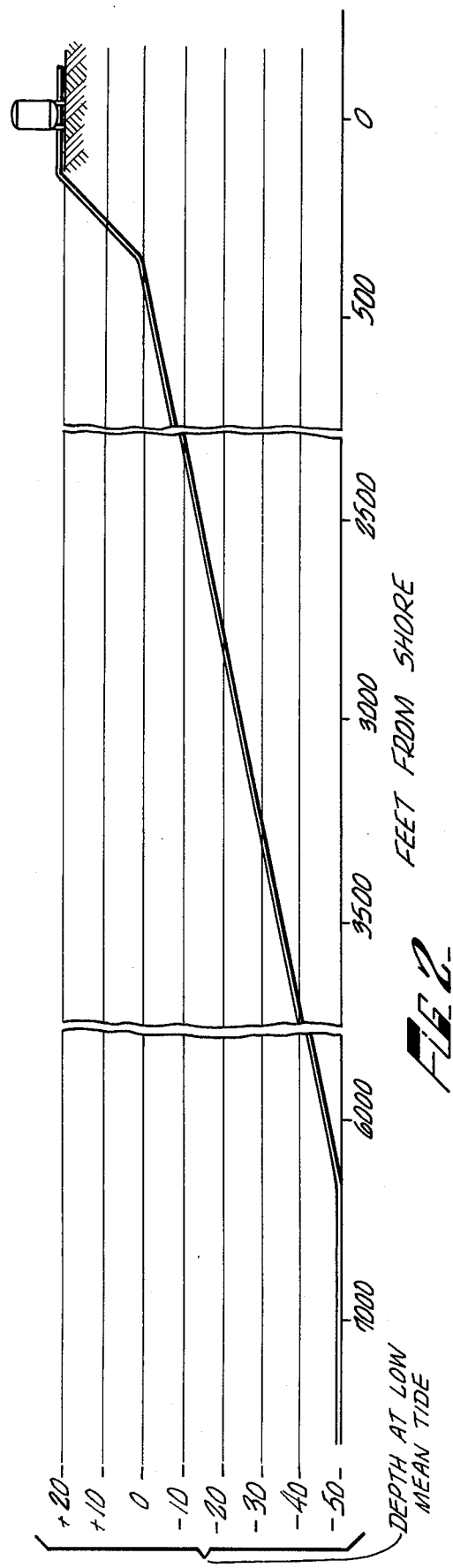

METHOD OF DETERMINING THE LOCATION OF UNDERWATER PIPELINE LEAKS

DETAILED DESCRIPTION OF THE INVENTION

The present invention relates to the method for determining the location of a leak in an underwater pipeline and in particular, relates to the method of determining the location of a leak in an underwater pipeline containing a stagnant liquid.

In the past, the presence of a leak in an underwater pipeline was detected by a change in pressure within the pipeline. For example, if a liquid was being pumped through the underwater pipeline, the presence of the leak was detected by an accompanying drop in pressure within the pipeline. This reduction in pressure was detected by conventional pressure gauges. However, in the case where the liquid was merely stagnate within the underwater pipeline, the presence of a leak could only be detected if the liquid within the pipeline had a specific gravity different than the specific gravity of water. In this case, the presence of the leak resulted in a change in pressure within the pipeline. In the case where the liquid within the pipeline had a specific gravity less than the specific gravity of water e.g. oil, the pressure within the pipeline could increase as the denser water flowed into the pipeline. Alternatively, if the liquid had a specific gravity greater than that of water, the pressure within the pipeline would decrease as the denser liquid flowed out of the pipeline.

Unfortunately, prior art methods were only capable of detecting the presence of a leak in an underwater pipeline but were unable to determine the location of the leak. Thus, upon discovery of the presence of a leak, it was necessary to send divers out into the water course along the pipeline to locate the position of the leak. In some cases, the underwater pipeline ran for a distance of up to several miles making discovery of the location of the leak a very difficult task. Further, if the liquid within the pipeline had a specific gravity less than that of water, locating the position of the leak was even more difficult due to the fact that initially very little of liquid would leak out from the pipe. Eventually, however, upon reaching equilibrium, the liquid would admix with the water and leak out of the pipeline to enable location of the leak.

SUMMARY OF THE INVENTION

It is therefore an object of the present invention to provide a method for rapidly determining the location of a leak in an underwater pipeline containing a stagnant liquid having a specific gravity different from that of water.

This and other objects and advantages are obtained by monitoring the pressure inside an underwater pipeline containing a stagnant liquid having a specific gravity different than that of water. Upon the development of a leak within the pipeline, the pressure inside the pipeline will change and the presence of the leak may be readily detected by the change in pressure. However, the location of the leak can be determined by accurately measuring the resulting pressure within the pipeline. The resulting pressure will be directly proportional to the specific gravity of the liquid and the depth of the pipeline at the site of the leak. Thus, the depth of the pipeline at the site of the leak can be calculated utilizing the following formula:

$$\text{Pressure inside pipeline} = (\text{Atmospheric Pressure}) + (\text{Pressure of the saltwater}) - (\text{Pressure of the liquid})$$

After determining the depth of the site of the leak, the location of the leak can then be readily determined by reference to a graph of the profile of the pipeline which plots the depth of the pipeline against the distance of the pipeline from shore.

BRIEF DESCRIPTION OF THE DRAWINGS

A more thorough disclosure of the objects and advantages of the present invention is presented in the detailed description which follows and from the accompanying drawings in which FIG. 1 is an illustrative view of a device for determining the location of a leak in an underwater pipeline according to the present invention.

FIG. 2 is a graph of the profile of an underwater pipeline.

BRIEF DESCRIPTION OF THE INVENTION

The present invention contemplates a method for determining the location of a leak in an underwater pipeline containing a stagnant liquid having a specific gravity different than that of water.

The method of the present invention is based on the phenomenon that upon the formation of a leak in an underwater pipeline containing a stagnant liquid having a specific gravity different than that of water, the pressure inside the pipeline will change. The resultant pressure within the pipeline will be directly proportional to the specific gravity of the liquid and the depth of the pipeline at the site of the leak. In the case where the liquid has specific gravity less than the specific gravity of water, the pressure inside the pipeline will increase. Alternatively, in the case where the liquid has a specific gravity greater than that of water, the pressure will decrease. The method of determining the location of the site of the leak comprises first measuring the exact pressure inside the pipeline and then calculating the depth of the pipeline at the site of the leak. The location of the leak can then be determined by reference to a graph of the profile of the pipeline which plots the depth of the underwater pipeline against the distance of the pipeline from shore.

In its preferred embodiment, the present method is utilized to determine the location of leaks in underwater oil pipelines which are used to unload ocean-going oil tankers that are too large to be brought in close into shore. The pipeline extends from a loading area located at a considerable distance off shore to storage tanks located on the beach. Between unloadings, the pipeline is filled with a displacement oil which is left standing in the pipeline. During unloading, the displacement oil is removed from the pipeline and the product oil is pumped through the pipeline at an elevated temperature. After the oil has been pumped into the storage tanks, the valve between the storage tanks and the pipeline is shut and the pipeline is again filled with a cold displacement oil. During the temperature stabilization there is some contraction of the oil volume which necessitates pumping in more displacement oil into the pipeline to perge air pockets from the pipeline and to completely fill the pipeline with oil. The pressure within the pipeline is then continuously monitored to detect any changes in pressure.

Referring to FIG. 1, there is shown suitable device for detecting the presence of a leak in the pipeline and a device for measuring the exact pressure within the pipeline. The device for detecting the presence of a leak comprises a tank 10 and vacuum pump 12. To detect the presence of a leak, the tank 10 is first evacuated preferably to a pressure of approximately 15 inches of mercury. After the pipeline has been completely filled with oil, valve 14 is opened to connect tank 10 to pipe-line 16. When the pipeline develops a leak, water will flow into the pipeline at the site of the leak thereby displacing oil within the pipeline and forcing oil into tank 10. When the tank is about half filled, a float valve shut-off mechanism (not shown) will close valve 14 and sound an alarm indicating the presence of a leak.

To determine the location of the leak, it is then necessary to accurately measure the pressure within the pipeline. This is preferably accomplished by utilizing an absolute pressure gauge 18. The absolute pressure gauge measures the difference in pressure between a vacuum and the source pressure. Since the absolute pressure gauge has a nonvariable zero point, it is significantly more accurate than other pressure measuring devices. A suitable absolute pressure unit for the practice of the present invention is manufactured and sold by Barton Corporation as Model 224. It will, however, be obvious to one skilled in the art that other absolute pressure measuring devices may also be utilized such as the Borden tube and that other suitable pressure measuring devices may be utilized. Preferably, an isolation diaphragm is positioned along the conduit connecting the pipeline to the pressure guage to prevent the heavy oil from contacting the sensitive pressure guage. The portion of the conduit between the diaphragm and the pressure guage is preferably filled with a light non-viscuous liquid such as glycerine. The isolation diaphragm comprises a small container having a flexible diaphragm positioned therein which divides the container into two chambers. The diaphragm thus allows transmission of pressures from the pipeline to the pressure gauge but prevents admixing of the oil with the glycerine.

After the presence of a leak has been discovered and the pressure within the pipeline has reached an equilibrium, valve 22 is opened and the pressure within the pipeline is measured. From the pressure measurement, the depth of the pipeline at the site of the leak is then determined by reference to a chart which gives the pressure within the pipeline for leaks located at various depths. The chart is prepared by calculating the pressure at various depths utilizing the following formula:

| (Pressure inside Pipeline P.S.I.A.) | = | (atmospheric pressure) | + | (Pressure of the saltwater) | − | (Pressure of the oil) |
|---|---|---|---|---|---|---|

For example at a depth of 30 feet where the pressure gauge is located at 20 feet above the surface of the water the pressure is calculated as follows:

Atmospheric Pressure = 14.7 PSIA

Specific gravity seawater = 1.03

Specific gravity of oil = .89

1 foot H$_2$O = 0.4335 PSI

P = 14.7 + (30 × 1.03 × 0.4335) − (30 × 0.89 × 0.4335) − (20 × 0.89 × 0.4335)

P = 8.80 P.S.I.A.

At a depth of 20 feet, pressure = 8.20 P.S.I.A.

At a depth of 10 feet, pressure = 7.60 P.S.I.A.

Thus, the depth of the pipeline at the site of the leak can be readily determined from the pressure inside the pipeline.

Referring to FIG. 2, it can be seen that after determining the depth of the pipeline at the site of the leak the location of the pipeline may be readily determined by reference to a chart or graph of the profile of the pipeline. For example, if the leak is at a depth of 35 feet at low mean tide, it can be seen that the location of the leak is approximately 3,500 feet offshore. However, if the same pressure measurement were obtained at a tide of 10 feet, the depth of the leak would still be 35 feet but the location of the leak would be approximately 3,000 feet offshore. After determining the location of the leak, divers and equipment can be immediately transported to the location to facilitate rapid repair of the leak.

After determining the location of the leak, a vacuum pump such as a 20 GPM pump can be attached to the pipeline to begin pumping out the pipeline and prevent the oil from escaping into the water. Pumping induces a flow across the leak site thereby significantly reducing leakage of oil into the water. By calculation of the pump flow versus the pipeline capacity between the pump and the leak site, the uncontaminated oil between the pump and the area of the leak site can be directed into a storage tank and reused.

While an embodiment and application of this invention has been shown and described, it will be apparent to those skilled in the art that many more modifications are possible without departing from the inventive concepts herein described. The invention, therefore, is not to be restricted except as is necessary by the prior art and by the spirit of the appended claims.

What is claimed is:

1. A method for determining the location of a leak in an underwater pipeline containing a stagnant liquid having a specific gravity different from that of water, comprising the steps of:
   measuring the pressure inside said pipeline after the formation of the leak;
   determining the depth of the pipeline at the site of the leak;
   locating the position of the leak in said pipeline by reference to a chart of the profile of the pipeline.

2. The method of claim 1 wherein said liquid is oil.

3. The method of claim 1 wherein said method comprises measuring the pressure utilizing an absolute pressure guage.

4. The method of claim 1 wherein said chart comprises a graph wherein said depth of said pipeline is graphed against the distance of said pipeline from shore.

5. A method for determining the location of a leak in an underwater pipeline containing stagnant oil comprising the steps of:
   measuring the pressure inside said pipeline after the formation of the leak;
   determining the depth of the pipeline at the site of the leak;
   locating the position of the leak in said pipeline by reference to a chart comprising a graph wherein said depth of said pipeline is grafted against the distance of said pipeline from the shore.

* * * * *